United States Patent
Sugihara et al.

(10) Patent No.: US 7,208,741 B2
(45) Date of Patent: Apr. 24, 2007

(54) X-RAY COMPUTED TOMOGRAPHY SCANNER AND X-RAY DETECTING SYSTEM

(75) Inventors: Naoki Sugihara, Nasu-Gun (JP); Michito Nakayama, Otawara (JP); Tatsuro Suzuki, Utsunomiya (JP)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 18 days.

(21) Appl. No.: 10/996,433

(22) Filed: Nov. 26, 2004

(65) Prior Publication Data

US 2006/0113483 A1 Jun. 1, 2006

(51) Int. Cl.
G01T 1/164 (2006.01)

(52) U.S. Cl. .............................. 250/370.11; 250/370.09
(58) Field of Classification Search ........... 250/370.11, 250/370.09
See application file for complete search history.

(56) References Cited

U.S. PATENT DOCUMENTS

| 4,068,306 A | 1/1978 | Chen et al. |
| 4,969,095 A | 11/1990 | Pauzat et al. |
| 5,352,884 A | 10/1994 | Petrick et al. |
| 2001/0000762 A1 | 5/2001 | Shepherd |
| 2002/0110216 A1 | 8/2002 | Saito et al. |
| 2002/0176535 A1 | 11/2002 | Dixon et al. |
| 2004/0065465 A1 | 4/2004 | Chappo et al. |

FOREIGN PATENT DOCUMENTS

| EP | 0 498 213 A2 | 8/1992 |
| EP | 0 788 277 A2 | 8/1997 |
| EP | 1 343 024 A1 | 9/2003 |
| FR | 2 087 247 | 12/1971 |
| JP | 2001-215281 A | 8/2001 |

OTHER PUBLICATIONS

"Power Distribution Using Bus Bars", Electronic Packaging & Production, vol. 30, No. 6, XP-00136046, Jun. 1, 1990, pp. 64-68.

*Primary Examiner*—Constantine Hannaher
(74) *Attorney, Agent, or Firm*—Oblon, Spivak, McClelland, Maier & Neustadt, P.C.

(57) ABSTRACT

An X-ray detection system has a detector and a data acquisition unit. The detector detects an X-ray passing through a body and producing an analog electric signal for each channel. The data acquisition unit includes a plurality of circuit blocks each including as many circuits as the number of channels assigned to each block. The data acquisition unit converts the analog electric signal into a digital signal for each channel and outputs the resultant digital signal. A phase control unit controls the phase of the circuit blocks such that the circuit blocks are grouped into a plurality of groups. The respective groups operate in synchronization with clock signals for the data acquisition unit. Phases of the clock signals are mutually different at least between two groups.

12 Claims, 10 Drawing Sheets

X-RAY COMPUTED TOMOGRAPHY SCANNER AND X-RAY DETECTING SYSTEM

CROSS REFERENCES TO RELATED APPLICATIONS

The present application relates to and incorporates by reference Japanese Patent application No. 2003-199378 filed on Jul. 18, 2003.

BACKGROUND OF THE INVENTION

1. Field of the Invention

The present invention relates to an X-ray computed tomography scanner and an X-ray-detection system, and more particularly, to an X-ray computed tomography scanner and an X-ray detection system, in which problems caused by noise or a fluctuation of an operating voltage in a detector or a DAS (data acquisition system) are solved thereby achieving a stable and reliable operation.

2. Description of the Related Art

An X-ray computed tomography scanner (hereinafter, referred to as an X-ray CT scanner) is known as one of computed tomography apparatuses. The X-ray CT scanner has been widely used for a long time as a tool of medical diagnosis and various medical research works. Since its advent, the X-ray CT scanner has progressed greatly and is still progressing.

In early types of X-ray CT scanners, it is capable of taking only a single slice of image at a time, and thus it is difficult to take many slices of images over a large range of a body being examined in a short time. Thus, in practical medical applications, there has been a strong need for a technique to take many slices of high-resolution images over a wide range of a body being examined in a short time.

To meet the above need, a multi-slice X-ray CT scanner has been developed recently and is becoming popular. In the multi-slice X-ray CT scanner, a two-dimensional detector array is used in which a specified number (for example, 4 or 8) of detector element columns each being similar to a linear array of detector elements used in a single-slice X-ray CT scanner are arranged in a direction perpendicular to the columns such that the two-dimensional detector array includes a total of M channels×N segments detector elements (where M and N are positive integers). A data acquisition system (DAS) is connected to outputs of the two-dimensional detector array.

The multi-slice X-ray CT scanner includes an X-ray source for emitting an X-ray beam spreading out in the form of a fan in a plane parallel to a slice direction and also includes a two-dimensional detector array of the type described above. Projection image data of a plurality of slices can be obtained at a time by detecting a cone-beam X-ray (with an effective diameter of field of view FOV) passing through a body being examined by the two-dimensional detector array. Thus, the multi-slice X-ray CT scanner is capable of acquiring a greater number of images with higher resolution than the single-slice X-ray CT scanner is capable of.

The two-dimensional detector array includes a scintillator, a photodiode array, and a CMOS switch array. An X-ray incident on the scintillator is converted into an optical signal, which is incident on the photodiode array and converted into an analog electric signal for each segment of the two-dimensional array. The electric signal of each segment is transferred to the DAS via a corresponding switch element of the CMOS switch array. Depending on a specified number of columns of detector elements in the slice direction, The CMOS switch array combines together electric signals output from elements of the photodiode array over each group including a specified number of columns of detector elements in the slice direction.

The DAS is a device including analog-to-digital converter elements (DAS circuit parts) arranged in the form of an array, for amplifying an analog detection signal received from the two-dimensional detector array and converting it into a digital signal. The resultant digital signal is subjected to an image reconstruction process.

Japanese Unexamined Patent Application Publication No. 2001-215281 discloses a detection system mainly including a two-dimensional detector array and a DAS that are similar to those described above and that are three-dimensionally disposed such that a photodiode array and a CMOS switch array are disposed on one surface of a double-sided circuit board and the DAS is disposed on the other surface. In this detection system, a scintillator block is disposed on the photodiode array such that they are optically coupled to each other. In practice, the above described parts are assembled on a block-by-block basis wherein each block is assigned a particular number of channels. In the typical X-ray CT scanner, the DAS usually has high circuit complexity to deal with as many channels as 500 to a few ten thousand channels. To reduce a difficulty with directly assembling such a large number of parts into a single piece, a circuit board is prepared for each block for handling several ten to several hundred channels, and a detector block is formed by disposing a photodiode array, a CMOS switch array, and a DAS part for dealing with assigned channels on either side of the circuit board. The plurality of detector blocks are disposed side by side on a partial surface of a sphere.

In this detection system, power is supplied to all detector blocks from a single power supply via a power cable.

The DAS deals with a small current. To avoid the small current dealt with by the DAS from being disturbed by noise intruding into the DAS via a ground path, a ground line of an electric circuit of the DAS is isolated from a base frame of the X-ray CT scanner, or, if the ground line is connected to the base frame, the connection is made only at a single point. In any case, a strong connection between the ground line of the electric circuit of the DAS and the base frame is avoided. The whole circuit of the DAS operates in synchronization with a single oscillator.

The conventional detection system described above has various unsolved problems.

A first unsolved problem relates to grouping of the DAS. Because the ground line of the electric circuit of the DAS is substantially isolated from the base frame, when the whole circuit of the DAS is operated in synchronization with the single oscillator, the ground level of the DAS has a fluctuation that causes noise to radiate from the ground line of the DAS and thus causes degradation in image quality.

Furthermore, the isolated ground causes a secondary problem that the fluctuation of the ground level of the DAS influences an operation of an analog signal.

Another problem is that a voltage drop occurs along the power cable via which the electric power is supplied to the detection system. The magnitude of the voltage drop varies in proportion to the length of the power cable, and thus the voltage drop varies from one detector block to another because the length of the power cable varies from one detector block to another. This produces non-uniformity of the operating characteristics of the DAS part among detector blocks. One possible technique to achieve sufficiently good uniformity of operation characteristics of the DAS part by reducing the difference in power supply voltage among detector blocks is to increase the diameter of the power cable extending from the power supply to each detector block as much as needed to reduce the voltage drop along the power cable to a sufficiently low level. Another technique is to set the length of each cable from the power supply to each detector block to be equal to the length of a longest cable from the power supply to a detector block at a most distant location. However, the both techniques cause an unacceptably large increase in space where the detection system is disposed, and thus both techniques cannot be realistic solutions.

SUMMARY OF THE INVENTION

In view of the above, it is a first object of the present invention to suppress fluctuations of a ground voltage and a power supply voltage caused by a clock-synchronized operation of DAS parts of each detector bock, thereby achieving a stable operation of an X-ray detecting system.

It is a second object of the present invention to supply a power supply voltage to a plurality of detector blocks via a power supply line disposed in a reduced space such that the difference in power supply voltage among a plurality of detector blocks is suppressed within an allowable range.

In an aspect, to achieve the first object, the present invention provides an X-ray detecting system comprising a detector detecting an X-ray passing through a body being examined and producing an analog electric signal corresponding to the X-ray for each channel, a data acquisition unit including a plurality of circuit blocks each including as many circuits as the number of channels assigned to each block, converting the analog electric signal output from the detector into a digital signal for each channel and outputting the resultant digital signal; and a phase control unit controlling the phase of the circuit blocks of the data acquisition unit such that the circuit blocks are grouped into a plurality of groups and the respective groups of circuit blocks operate in synchronization with clock signals whose phase are different at least between two groups.

As an example, the phase control unit controls the phase of the circuit blocks of the data acquisition unit such that the circuit blocks are grouped into two groups and the two groups of circuit blocks operate in synchronization with two respective clock signals that are opposite in phase.

Moreover, it is as another example, the phase control unit comprises an oscillator generating a reference clock signal and a unit supplying the clock signal generated by the oscillator directly to at least one group of the plurality of groups of circuit blocks and supplying a clock signal produced by inverting the polarity of the clock signal generated by the oscillator to the remaining groups of circuit blocks.

Moreover, it is as another example, the phase control unit includes as many oscillators generating reference clock signals to be supplied to the plurality of circuit blocks as there are circuit blocks, and the reference clock signals generated by the oscillators are supplied to the respective circuit blocks independently and asynchronously.

Moreover, it is as another example, the phase control unit includes a unit generating reference clock signals that are delayed by a specified time from one reference clock signal to another and supplying the resultant reference clock signals to respective circuit blocks.

In another aspect, to achieve the second object, the present invention provides an X-ray detecting system comprising a detector including a plurality of circuit blocks assigned to a specified number of channels, detecting an X-ray passing through a body being examined and producing an analog electric signal corresponding to the X-ray for each channel, a data acquisition unit including as many circuit blocks as the number of circuit blocks of the detector, converting the analog electric signal output from the detector into a digital signal for each channel and outputting the resultant digital signal and voltage regulators disposed for the respective circuit blocks, regulating power supply voltages supplied to the respective circuit blocks at a specified voltage value.

Moreover, as another preferred embodiment, a plate-shaped conductor supplying a power supply voltage to respective circuit blocks may be provided.

The present invention also provides an X-ray computed tomography scanner comprising an X-ray detecting system according to any aspect described above, and a data processing unit reconstructing an image using data acquired by the X-ray detecting system.

In the X-ray computed tomography scanner and the X-ray detecting system according to the present invention, the X-ray detecting system is formed so as to suppress radiation noise caused by fluctuations of ground voltages of the plurality of detector blocks and so as to handle variations in operating characteristics among detector blocks due to variations of power supply voltage among detector blocks. Thus, high stability and excellent uniformity are achieved in the X-ray detecting operation, thereby making it possible to improve image quality. Besides, a reduction of physical size of the system is also achieved.

DESCRIPTION OF THE PREFERRED EMBODIMENTS

The present invention will now be described in further detail below with reference to embodiments in conjunction with the accompanying drawings.

First Embodiment

A first embodiment will now be described below with reference to FIGS. 1 to 9.

Figure 1:
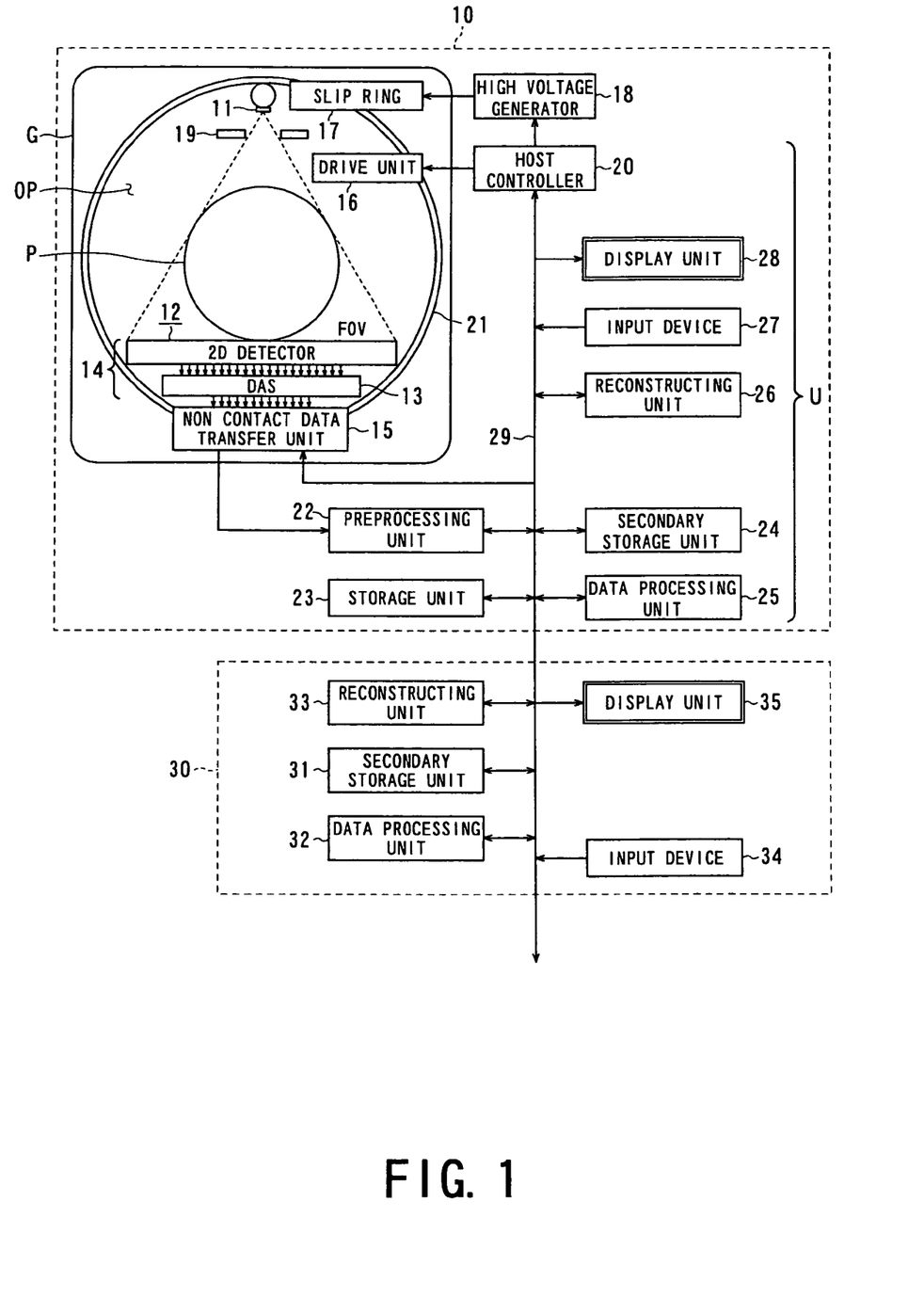
FIG. 1 is a block diagram schematically showing an X-ray CT scanner according to an embodiment of the present invention.

FIG. 1 shows a multi-slice X-ray CT scanner according to the first embodiment of the present invention. This multi-slice CT scanner is capable of performing not only multi-slice helical scanning but also conventional scanning (single-slice scanning and multi-slice scanning). As shown in FIG. 1, the multi-slice CT scanner 10 includes a bed (not shown) on which to lay a body (patient) P to be examined, a base frame G having a diagnosis cavity OP through which to insert the body P, for acquiring projection image data associated with the body P, and a data processing unit U for controlling the operation of the whole base frame G, reconstructing the projection data into an image, and displaying the resultant image.

The bed includes a top plate slidable in a longitudinal direction by a bed driving unit (not shown). In most cases, the body P is laid such that the axis of the body is parallel to the longitudinal direction of the bed.

The base frame G includes an X-ray tube 11 serving as an X-ray radiation source disposed such that the body P inserted in the diagnosis cavity OP is located between the X-ray tube 11 and the bed, an X-ray detector 12 that will be described in detail later, and an x-ray detection system 14 including a data acquisition system (DAS 13). In addition, the base frame G also includes non-contact data transfer unit 15, a bed driving unit 16, and a slip ring 17.

The X-ray tube 11 and the X-ray detection system 14 (including the X-ray detector 12 and the DAS 13) are disposed on a rotating ring 21 that is rotatable inside the base frame G under the control of the bed driving unit 16. That is, the X-ray tube 11 and the X-ray detection system 14 are rotatable in unison about a rotation axis parallel to the body axis of the body P inserted in the diagnosis cavity OP of the base frame G. The rotation ring 21 is rotated at as high a rotation speed as one revolution per second or higher.

The X-ray tube 11 generates an X-ray in the form of a cone beam or a fan beam toward the patient's body P lying in an effective diameter of field of view FOV. Electric power (tube voltage or tube current) needed for the X-ray tube 11 to generate the X-ray is supplied from a high-voltage generator 18 via a slip ring 17. More specifically, the X-ray tube 11 generates the X-ray in the form of the fan beam spreading out in a slice direction parallel to the rotation axis or in the form of the cone beam spreading out in the slice direction and also in a channel direction perpendicular to the slice direction. In most cases, the body P lies on the top table of the bed along the longitudinal direction of the bed, and thus the slice direction is parallel to the body axis of the body P.

In the inside of the base frame G, a collimator 19 is disposed between the X-ray tube 11 and the body P. The collimator 19 shapes the cone-beam or fan-beam X-ray emitted from an X-ray focal point of the X-ray tube 11 into an X-ray beam with a particular beam size.

The data processing unit U includes a host controller 20, which serves as a key device, and further includes a preprocessing unit 22 for performing preprocessing such as data correction, a storage unit 23, a secondary storage unit 24, a data processing unit 25, a reconstructing unit 26, an input device 27, and a display unit 28, wherein these units are connected to each other via a data/control bus 29. The bus 29 is also connected to an external image processing apparatus 30. The image processing apparatus 30 includes a secondary storage unit 31, a data processing unit 32, a reconstructing unit 33, and input device 34, and a display unit 35.

The preprocessing unit 22 performs a sensitivity correction or an X-ray intensity correction on projection image data received from a non-contact data transfer unit 15. After the sensitivity correction or the X-ray intensity correction is performed by the preprocessing unit 22, for example, 1000 sets (1000 views) of two-dimensional projection image data taken over 360° are temporarily stored in the storage unit 23.

The reconstructing unit 26 produces (reconstructs) a slice of tomogram data by reconstructing the projection image data stored in the storage unit 23 according to a fan-beam reconstruction method or a cone-beam reconstruction method.

Referring to FIGS. 2 to 6, the X-ray detection system 14 according to the present embodiment will now be described in detail below.

Figure 2:
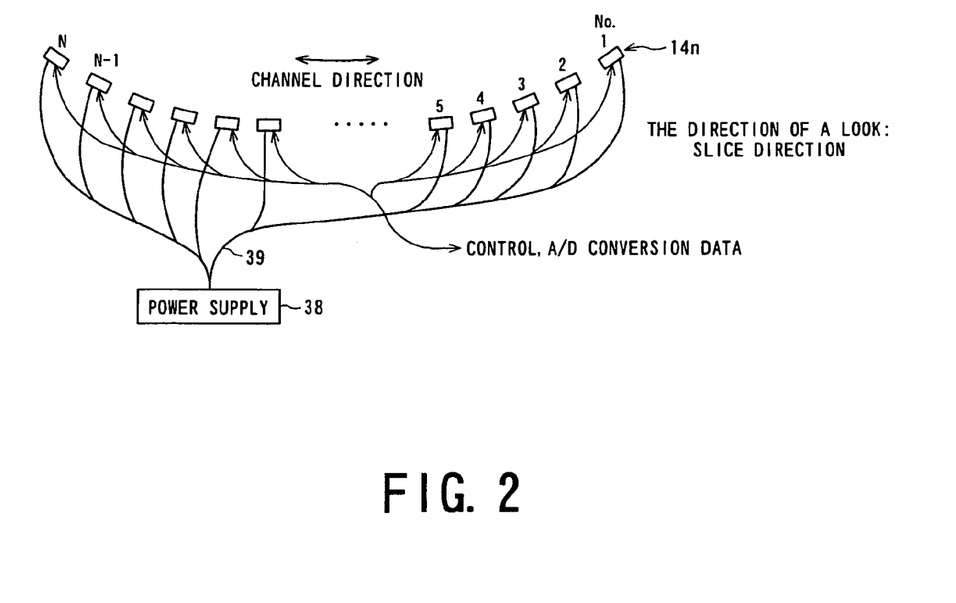
FIG. 2 is a diagram schematically showing an X-ray detection system used in an X-ray CT scanner according to an embodiment of the present invention.

The X-ray detection system 14 is a device detecting an incoming X-ray after passing through a body P being examined. The X-ray detection system 14 includes a two-dimensional array of X-ray detector elements arranged in orthogonal two directions (in a slice direction and in a channel direction) to two-dimensionally detect an X-ray.

More specifically, as shown in FIG. 2, the X-ray detection unit 14 includes a plurality of (for example, 38) detector blocks $14_1$ to $14_n$. Power is supplied from an external power supply 38 to the respective detector blocks $14_1$ to $14_n$ via a cable 39.

Figure 3:
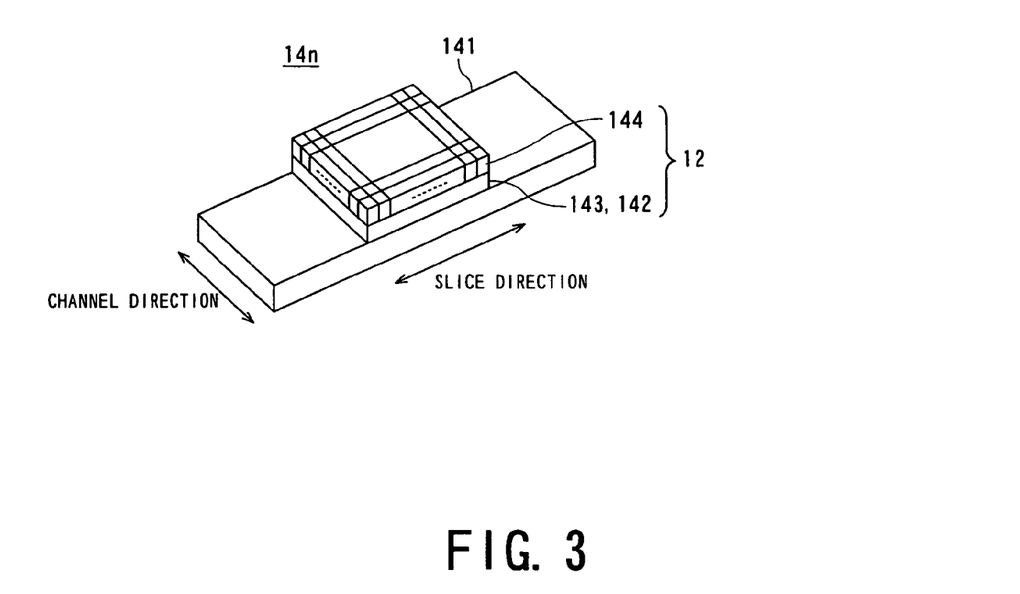
FIG. 3 is a perspective view, seen from an X-ray incidence side, of one of detector blocks disposed on an X-ray detection system.
Figure 4:
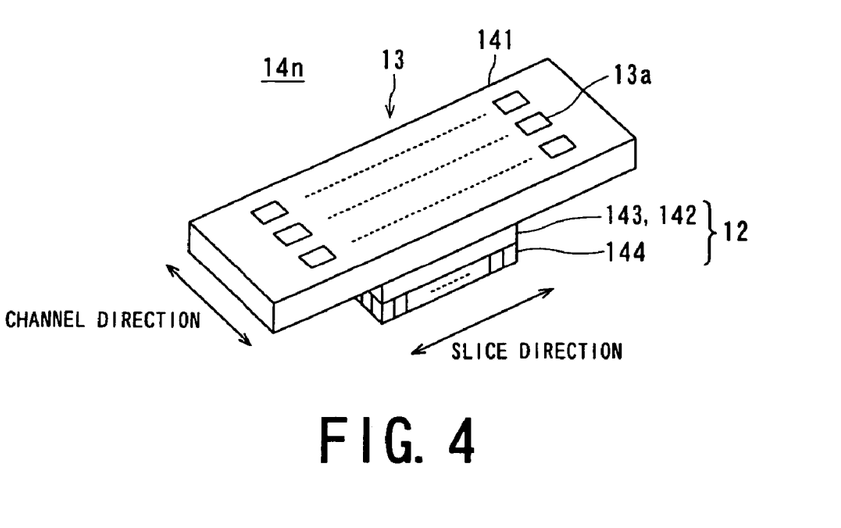
FIG. 4 is a perspective view, seen from a backside, of one of detector blocks disposed on the X-ray detection system.

Each detector block $14_n$ (generically denoted by $14_n$) includes a particular number of detection channels, assigned to the detector block, of the total number of detection channels. In the X-ray CT scanner, the DAS 13 usually has 500 to several ten thousand channels in total, the DAS 13 is divided into a plurality of blocks each including several ten to several hundred channels. Each of the detector blocks $14_1$ to $14_n$ is disposed such that X-ray detector elements of each block are arranged in the channel direction along an arc and such that the total of X-ray detector elements forms an x-ray incidence surface in the form of a partial surface of a sphere whose center is located at the focal point of the X-ray tube 11. FIGS. 3 and 4 show a specific example of a structure of one of detector blocks 14₁ to 14ₙ.

Each detector block 14ₙ has a rigid double-sided printed circuit board 141, and a CMOS switch array (switching element array) 142, a photodiode array, 143, and a scintillator block 144 is disposed in an one-on-another fashion in the same order as described herein on one of the surface of the printed circuit board 141. The CMOS switch array 142 and the photodiode array 143 are electrically connected to each other. The photodiode array 143 is optically coupled with the scintillator block 144. An assembly of CMOS switch arrays 142, photodiode arrays 143, and the scintillator blocks 144 of the detector blocks 14₁ to 14ₙ, forms, as a whole, the X-ray detector 12. DAS circuit parts 13a of the DAS 13 corresponding to the respective detector blocks 14ₙ are disposed on the opposite surface of the printed circuit 141. The DAS circuit parts 13a are electrically connected to the CMOS switch array 142. Thus, the X-ray detector 12 and the DAS are three-dimensionally assembled via the printed circuit 141.

Figure 5:
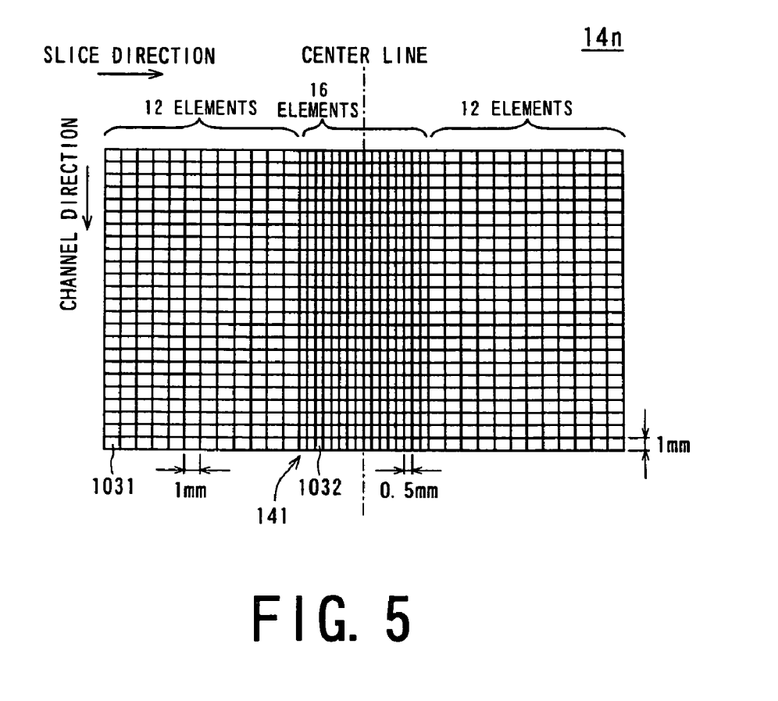
FIG. 5 is a diagram showing an arrangement of X-ray detector elements of one of detector blocks disposed in an X-ray detection system used in an X-ray CT scanner according to an embodiment of the present invention.

FIG. 5 shows a development of detector blocks 14ₙ seen from the X-ray incidence side. The detector block 14ₙ includes a plurality of detector elements 1031 and 1032 formed by the scintillator block 144 and the photodiode array 143. These detector elements 1031 and 1032 are arranged in the form of a two-dimensional array whose columns and rows extend in a channel direction and a slice direction, respectively.

Of the detector elements 1031 and 1032, the detector elements 1031 each have a sensible width of 1.0 mm in the slice direction and a sensible width of 0.5 mm in the channel direction. The detector elements 1032 each have a sensible width of 0.5 mm in the slice direction and a sensible width of 0.5 mm in the channel direction.

Note that the sensible width of the photodiode is defined by a sensible value that will be obtained when measured on the rotation axis of the X-ray tube 11. Therefore, for example, a photodiode with a sensible with of 1 mm is a photodiode whose sensible width measured on the rotation axis of the X-ray tube is equal to 1 mm. In a practical situation in which the X-ray spreads out, the actual sensible width is equal to the sensible width measured on the rotation axis multiplied by the ratio of the distance from the X-ray focal point to the photodiode at its actual location to the distance from the X-ray focal point to the point on the rotation axis of the X-ray tube. That is, the sensible width of such a photodiode with a sensible width of 1 mm can be slightly greater than 1 mm, because the distance from the X-ray focal point to the photodiode at its actual location can be greater than the distance from the X-ray focal point to the point on the rotation axis of the X-ray tube.

The detector elements 1032 with the sensible width of 0.5 mm are arranged in the form of an array having 16 columns as measured in the slice direction. The detector elements 1031 with the sensible width of 1 mm are arranged in the form of an array in both areas directly adjacent to the array of the detector elements 1032 with the sensible width of 0.5 mm such that each array of detector elements 1031 with the sensible width of 1 mm has a less number of columns (for example, 12 columns) as measured in the slice direction than the number of columns of the array of detector elements 1032 with the sensible width of 0.5.

In the present embodiment, the number of columns (16 columns in this specific example) of the array of detector elements 1032 as measured in the slice direction is set to be greater than the number of columns (12 columns in this specific example) of either adjacent array of detector elements 1031 and less than the total number of columns (24 columns in this specific example) of arrays of detector elements 1031. That is, in the X-ray detector 12 according to the present embodiment, the detector blocks 14₁ to 14ₙ as a whole form a two-dimensional detector array having 912 rows as measured in the channel direction and 40 columns as measured in the slice direction.

Although in the example described above, the X-ray detector 12 has detector elements arranged in the form of the two-dimensional array whose element-to-element pitch varies depending on whether detector elements have a sensible width of 0.5 mm or 1.0 mm, the X-ray detector 12 may be formed by disposing detector elements with an equal sensible width in the form of a two-dimensional array. Furthermore, the size of each detector element is not limited to 0.5 mm or 1.0 mm, but other sizes such as 1.25 mm may be employed. An analog signal of a two-dimensional X-ray projection image obtained via a great number of X-ray detector elements 1031 and 1032 is transmitted to the DAS 13 via the CMOS switch array 142. More specifically, the X-ray projection image data is transmitted via the CMOS switch array 142 to the DAS 13 including data acquisition elements arranged in the form of an array (having, for example, 912 rows and 8 or 4 columns) whose number of columns is less than that of the X-ray detector element array (having, for example, 912 rows and 40 columns).

In the process of transferring the X-ray projection image data to the DAS 13, under the control of the host controller 20, the CMOS switch array 142 calculates the sum of X-ray projection image data over a specified number of columns in the slice direction thereby producing two-dimensional projection image data including the specified number of columns. The DAS 13 is formed of a plurality of data acquisition elements, that is, DAS circuit chips 13a serving as analog-to-digital converters that are arranged in the form of a two-dimensional array as with the X-ray detector 12. In this DAS 13 constructed in such a manner, each data acquisition element amplifies received X-ray image data and converts it into a digital form thereby producing digital projection image data. Because a specified number of columns of X-ray image data are added together in the slice direction, the total number of columns of data acquisition elements in the slice direction is less than the number of columns of X-ray detector elements of the X-ray detector 12.

The digital two-dimensional projection image data output from the DAS 13 is transmitted to the data processing unit U via the non-contact transfer unit 15 using an optical transmission technique. Instead of the data transfer unit 15 using the non-contact optical transmission, a contact-type data transfer unit using a slip ring or the like may be used.

The detection operation using the X-ray detector 12 is preformed as many times as, for example, 1000 times during 1 rotation (for 1 sec). As a result, two-dimensional projection image data including M×N channels is generated 1000 times for every 1 sec (1 rotation). To transmit two-dimensional projection image data with a large data size generated at a high data rate without a time delay, the DAS 13 and the non-contact data transfer unit 15 operate at a very high speed.

In the data processing unit U, the received digital projection image data is applied to the preprocessing unit 22. After the digital projection image data subjected to preprocessing in the preprocessing unit 22, the resultant digital projection image data is stored in the secondary storage unit 24 and subjected to an image reconstruction process performed by the reconstructing unit 26. As a result, a reconstructed X-ray scan image is obtained.

Figure 6:
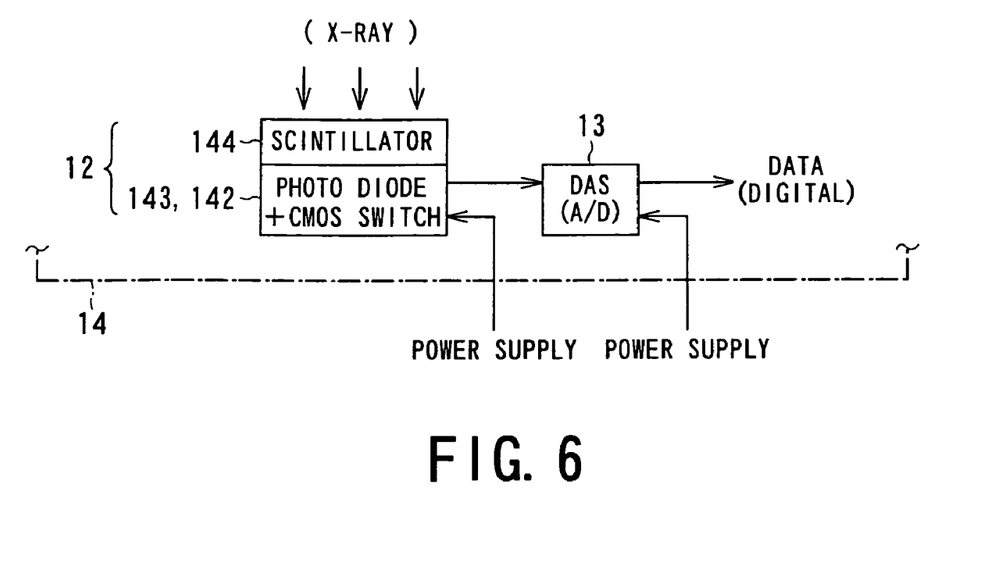
FIG. 6 is a circuit diagram of a detector block of an X-ray detection system.

FIG. 6 is a circuit block diagram of the X-ray detection system 14 constructed in the above-described manner. A power supply voltage is supplied to the photodiode array chip 143, the CMOS switch array chip 142, and the DAS circuit part 13a of the DAS 13, such that the power supply voltage is supplied separately for each detector block.

Figure 7:
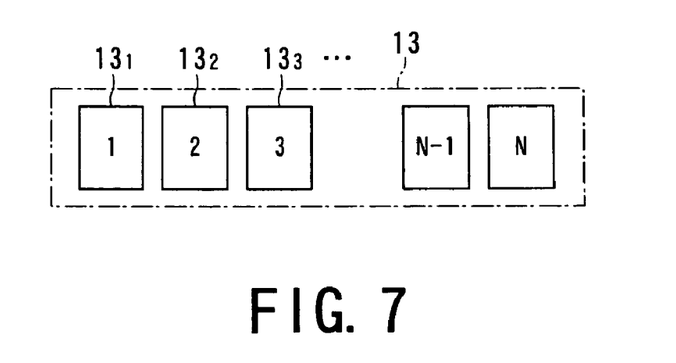
FIG. 7 is a diagram conceptually showing a manner in which a DAS is divided into blocks.

The X-ray detection system 12 is formed of the plurality of blocks as described above, and the DAS 13 has blocks corresponding to the blocks of the X-ray detection system 12. FIG. 7 schematically shows blocks of the DAS 13 including DAS circuits $13_1$ to $13_n$ (each including DAS circuit parts 13a) corresponding to the respective detector blocks $14_1$ to $14_n$. The DAS 13 as a whole is capable of acquiring data of as many channel as, for example, 1000 channels (equal to the number of data acquisition elements arranged in the channel direction). When the DAS 13 includes 10 blocks, each of the DAS circuits $13_1$ to $13_n$ acquires 100 channels of data.

Figure 8:
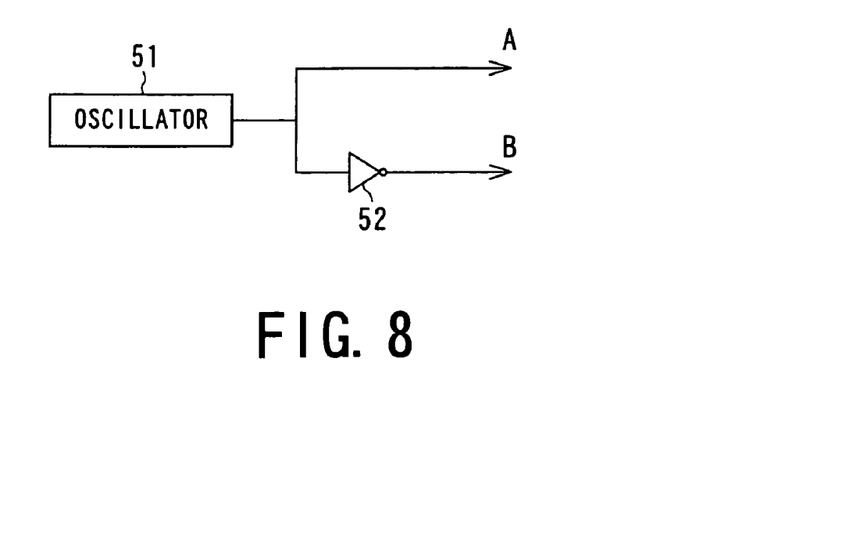
FIG. 8 is a circuit diagram showing a manner in which reference clock signals are supplied in an X-ray detecting system of an X-ray CT scanner according to a first embodiment.
Figure 9:
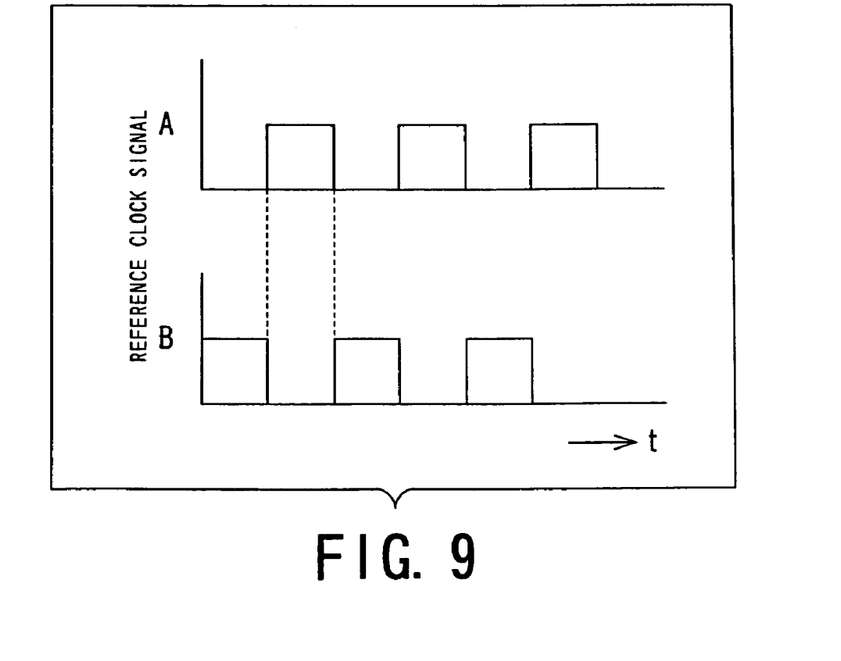
FIG. 9 is a timing chart showing reference clock signals that are opposite in phase to each other, according to the first embodiment.

In the present embodiment, a reference clock signal generated by a single oscillator 51 is applied to the DAS circuits $13_1$ to $13_n$ via two paths as shown in FIG. 8. More specifically, the rectangular-shaped reference clock signal generated by the oscillator 51 is directly output over a path A and also output over a path B after the signal is inverted by an inverter 52. As a result, as shown in FIG. 9, the reference clock signal supplied via the path A is opposite in phase to the reference clock signal supplied via the path B.

The oscillator 51 and the inverter 52 may be disposed in a case (not shown) of the X-ray detection system 14 or may be disposed in the power supply 38 (FIG. 2) separately disposed from the X-ray detection system 14.

The DAS circuits $13_1$ to $13_n$ are grouped such that the reference clock signal supplied via the path A is applied in common to DAS circuits $13_1$, $13_3$, and so on at odd-numbered locations, and the reference clock signal supplied via the path B is applied in common to DAS circuits $13_2$, $13_4$, and so on at even-numbered locations. Each DAS circuit performs analog-to-digital conversion in synchronization with the given reference clock signal.

As described above, in the scanning operation using the X-ray CT scanner according to the present embodiment, the X-ray passing through the body is detected by the X-ray detection system 14, and an X-ray CT image is reconstructed from the projection image data output from the X-ray detection system 14. In the detection of the X-ray, the DAS circuits $13_1$ to $13_n$ of the DAS 13 in the X-ray detection system 14 are driven by the two reference clock signals that are opposite in phase. This allows radiation noise due to fluctuations of the ground voltage or the power supply voltage to be cancelled out substantially perfectly within the DAS 13. Thus, noise is suppressed, and a high-quality X-ray CT image can be obtained.

The manner of supplying the reference clock signal to the DAS 13 according to the first embodiment may be modified variously as described below.

Figure 10:
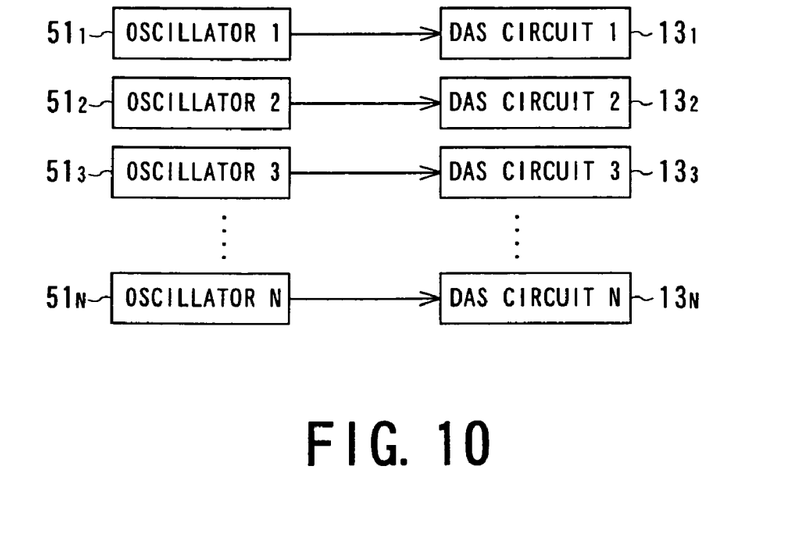
FIG. 10 is a diagram showing a manner in which reference clock signals are supplied according to a modification of the first embodiment.
Figure 11:
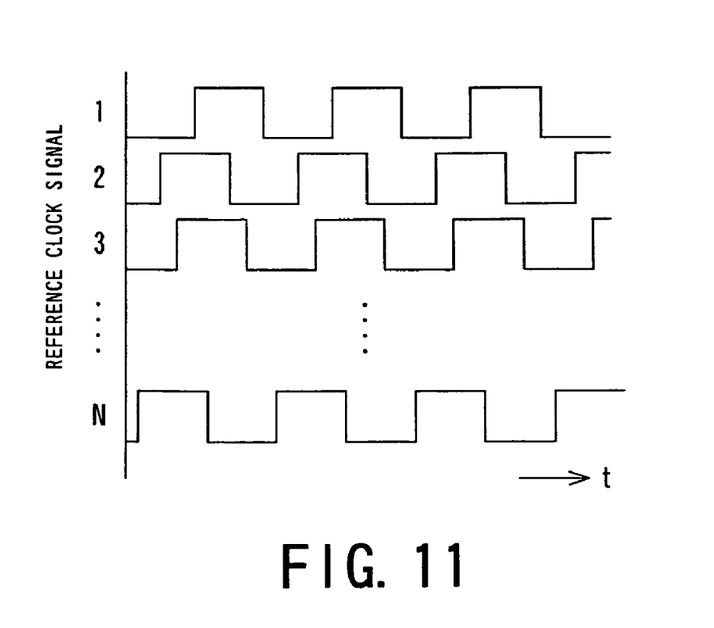
FIG. 11 is a timing chart showing reference clock signals having scattered phases according to a modification of the first embodiment.

A first modification is shown in FIGS. 10 and 11. In this modification, as shown in FIG. 10, as many oscillators $51_1$ to $51_n$ are prepared as there are DAS circuits $13_1$ to $13_n$ into which the DAS 13 is blocked, and reference clock signals output from the oscillators $51_1$ to $51_n$ are separately supplied to respective DAS circuits $13_1$ to $13_n$. Thus, as shown in FIG. 11, the DAS circuits $13_1$ to $13_n$ operate in synchronization with the respective reference clock signals that are independent of one another. Note that the operation is asynchronous among the DAS circuits $13_1$ to $13_n$, because each DAS circuit operate separately in synchronization with a reference clock signal independent of the other reference clock signals. This allows fluctuations of the ground voltage or the power supply voltage of the DAS circuits $13_1$ to $13_n$ to be scattered or substantially canceled out. Thus, radiation noise is suppressed, and high-quality X-ray CT image can be obtained.

Figure 12:
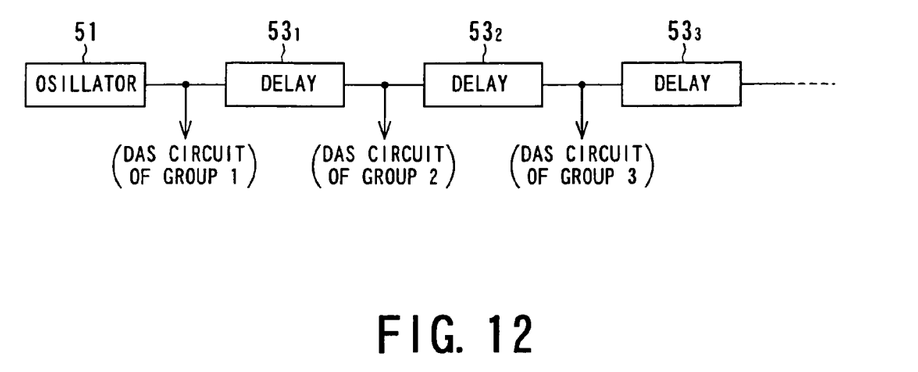
FIG. 12 is a diagram showing a manner in which reference clock signals are supplied according to another modification of the first embodiment.

A second modification is shown in FIG. 12. In this second modification, as shown in FIG. 12, a reference clock signal generated by a single oscillator 51 is sequentially delayed by a fixed time by each of delay circuits $53_1$ to $53_{n-1}$. The DAS circuits $13_1$ to $13_n$ of the DAS 13 are grouped into as many groups as there are the delay circuits $53_1$ to $53_{n-1}$, and reference clocks signals output from the oscillator 51 and the respective delay circuits $53_1$ to $53_{n-1}$ are supplied to the respective groups of DAS circuits. In this modification, reference clock signals which are delayed by the fixed time form one clock signal to another can be generated by using only one oscillator 51. This allows fluctuations of the ground voltage or the power supply voltage to be scattered or substantially canceled out. Thus, radiation noise is suppressed, and high-quality X-ray CT image can be obtained.

Second Embodiment

Figure 13:
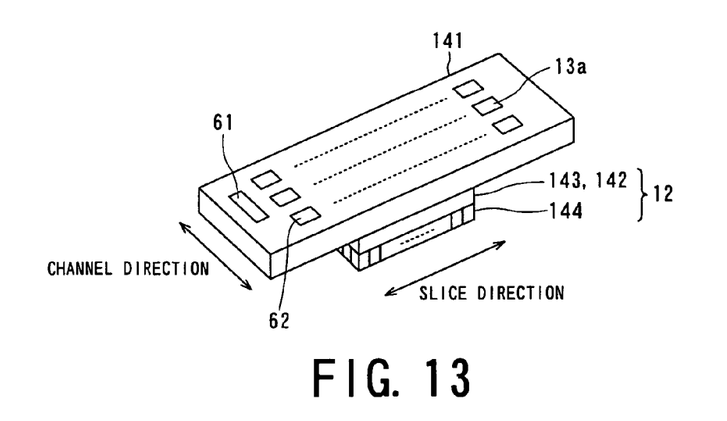
FIG. 13 is a perspective view of one of detector blocks disposed in an X-ray detecting system of an X-ray CT scanner according to a second embodiment of the present invention.
Figure 14:
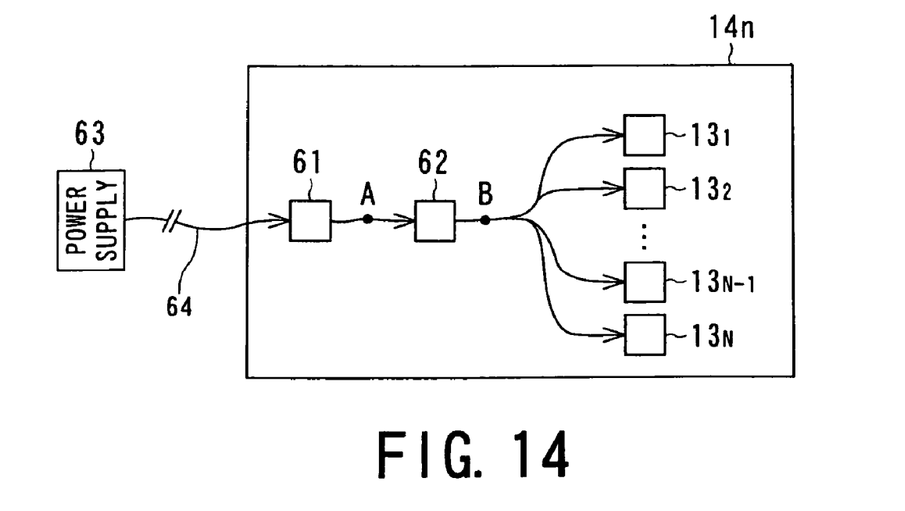
FIG. 14 is a block diagram showing a manner in which electric power is supplied to each detector block according to the second embodiment.
Figure 15:
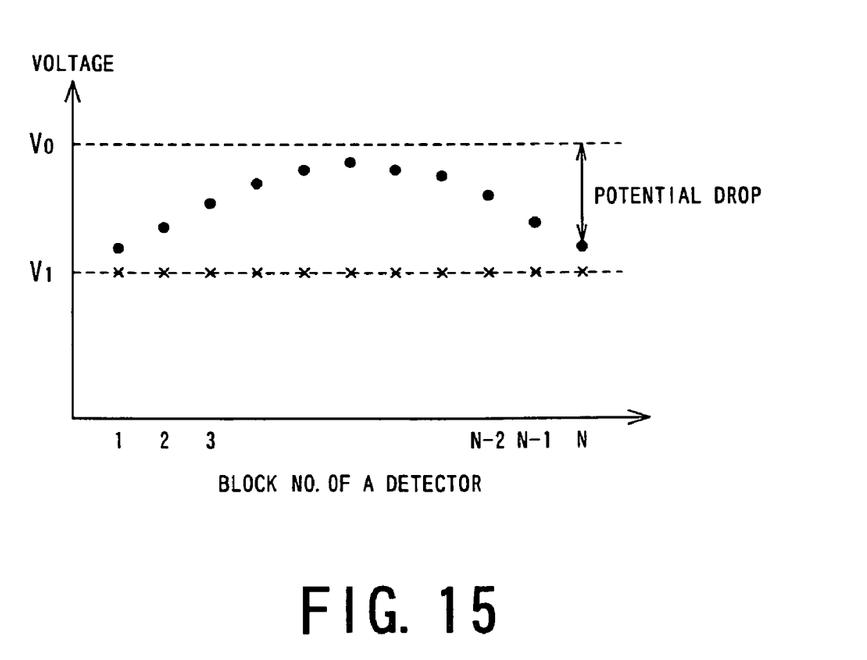
FIG. 15 is a graph showing a manner in which power supply voltages of respective detector blocks are regulated according to the second embodiment.

Referring to FIGS. 13 to 15, a second embodiment of the present invention will now be described below.

This second embodiment relates to a technique to adjust the voltage of respective detector blocks $14_n$ of the X-ray detection system 14 in the X-ray CT scanner. The X-ray CT scanner according to the second embodiment is generally similar to that according to the first embodiment described above. Similar parts to those in the first embodiment are denoted by similar reference numerals, and a duplicated description thereof is not given herein.

In this second embodiment, as shown in FIG. 13, each detector block $14_n$ has a power connector 61 and a voltage regulator 62 disposed on a surface, facing the DAS, of a printed circuit board 141. As shown in FIG. 14, an output terminal of a power supply 63 and the power connector 61 of each detector block $14_n$ is connected to an output terminal of a power supply 63 via a cable 64, and thus electric power is supplied to the voltage regulator 62 via the power connector 61.

The voltage regulator 62 regulates an input voltage at a predetermined voltage. The output terminal of the voltage regulator 62 is connected in parallel to DAS circuits 13, to $13_n$ of each detector block $14_n$. In FIG. 14, the output voltage Vo of the power supply 63 is set such that the input voltage of the voltage regulator 62 is greater than a specified value V1 (for example, 5 V) needed for the DAS circuit parts 13a even for a detection block $14_n$ having a longest cable 64.

Thus, in any detector block $14_n$, the voltage regulator 62 receives an input voltage (for example, 6 V) greater than the specified value $V_1$ and regulates (reduces) the input voltage at the specified voltage V1 (for example, 5V).

In the X-ray detection system 14 according to the present embodiment, as described above, although the voltage drop along the cable 64 varies (for example, by about 0.1 V to 0.5 V) among detector blocks $14_n$, the power supply voltage actually supplied to each detector block $14_n$ is regulated at the specified value $V_1$ regardless of the amount of the voltage drop.

Thus, all DAS circuit parts 13a of all detector blocks operate with the same voltage. This eliminates or suppresses the variation in analog-to-digital conversion characteristic that would otherwise occur due to the variation in power supply voltage among detector blocks. As a result, uniform X-ray detection characteristics are achieved over all detector blocks, and thus high performance is achieved as a whole.

Third Embodiment

Figure 16:
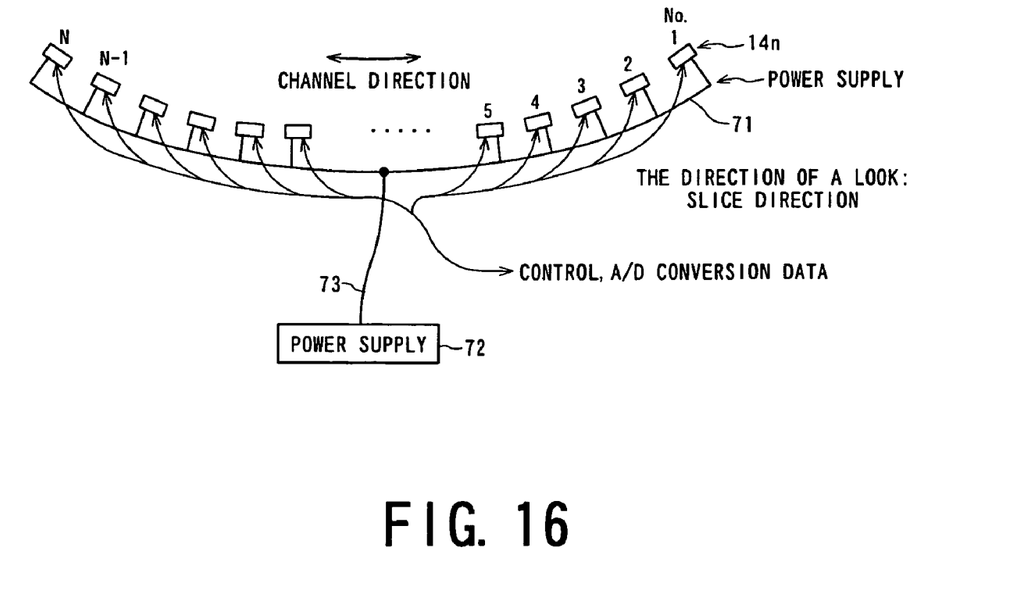
FIG. 16 is a perspective view of an X-ray detecting system of an X-ray CT scanner according to a third embodiment of the present invention.
Figure 17:
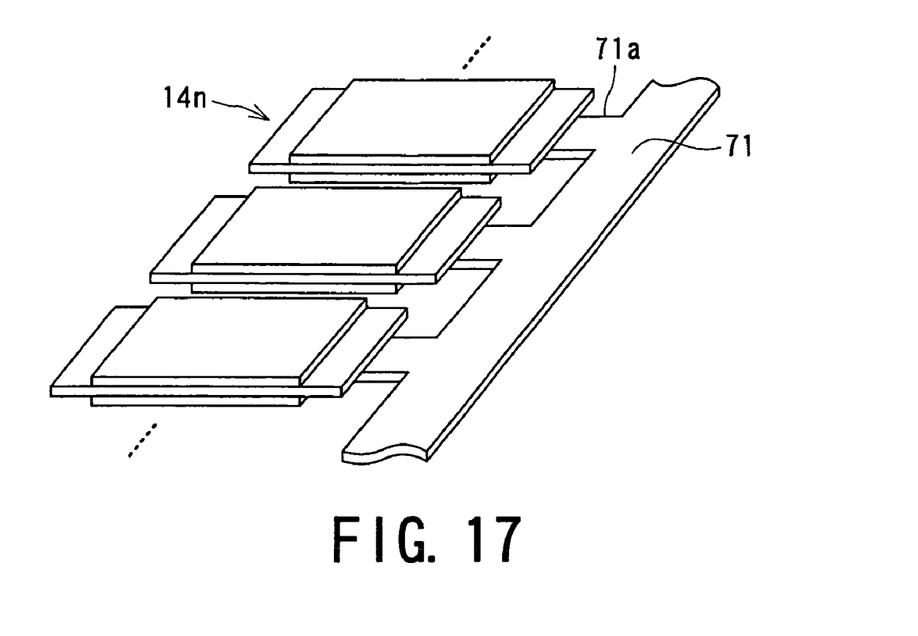
FIG. 17 is a diagram showing a manner in which electric power is supplied using a metal bar according to the third embodiment.

Referring to FIGS. 16 and 17, a third embodiment of the present invention will now be described below.

This third embodiment relates to the structure of the power supply line of each detector block $14_n$ of the X-ray detection system 14 in the X-ray CT scanner. Except for the structure of the power supply line, the X-ray CT scanner according to the second embodiment is basically similar to that according to the first embodiment described above.

In the X-ray detection system 14 according to the present embodiment, as shown in FIG. 16, a power supply line supplying a (positive) power supply voltage to respective detector blocks $14_n$ is formed of a plate-shaped metal bar 71. More specifically, a power supply voltage is supplied from a power supply 72 to the X-ray detection system 14 via a cable 73, and further supplied to the respective detector blocks $14_n$ inside the X-ray detection system 14 via the metal bar 71. As shown in FIG. 17, the metal bar 71 has branches 71a whose end is electrically connected to a particular part of each detector block $14_n$ by using a screw or a connector.

Use of the metal bar 71 as the power supply line minimizes the variation in voltage drop of the power supply voltage depending on the locations of the detector blocks $14_n$, and thus the difference in power supply voltage among detector blocks is suppressed to a very low level. As a result, high stability is achieved in the detecting operation, and thus high image quality can be obtained. Besides, it becomes unnecessary to use a large-diameter cable, and it becomes possible to reduce the space where to dispose the power supply line in the X-ray detecting system 14 and thus it becomes possible to reduce the total size of the X-ray detecting system 14.

To prevent the X-ray detection system 14 from encountering intrusion of noise described in the first embodiment, interconnections among the detector blocks $14_n$ in the DAS 13 may be adapted as follows. In an interconnection structure shown in FIG. 18, detection blocks $14_n$ adjacent to each other in the channel direction are connected to each other via a block connector 81. Depending on the type of the X-ray detecting system 14, interconnections for transmitting data among detection blocks $14_n$ are necessary in addition to interconnections for DAM chips serving as analog-to-digital converter ICs (for example, for 16 ICs).

Figure 18:
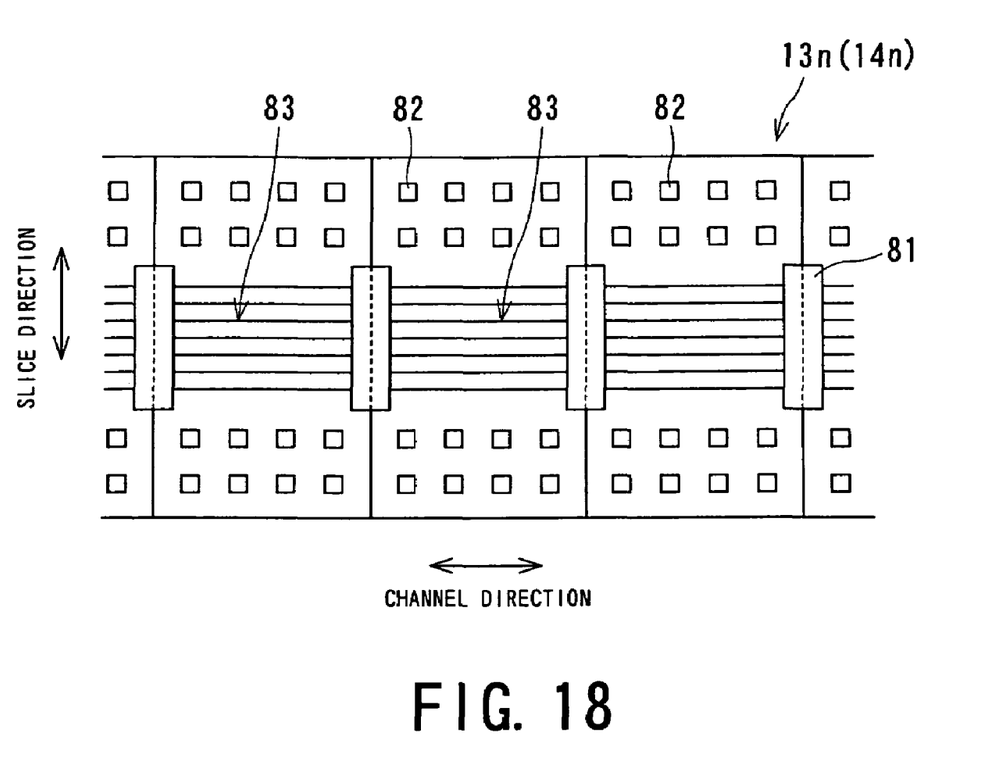
FIG. 18 is a diagram showing a manner in which detector blocks are connected via interconnections according to a modified embodiment.

In this case, as shown in FIG. 18, it is desirable that interconnections for the DAM chips 82 that deal with analog signals are disposed separately from interconnections 83 for transmitting digital data among. In the example shown in FIG. 18, the interconnections 83 are disposed in the center (as seen in the slice direction) of each detection block $14_n$ and DAM chips 82 are disposed in both areas adjacent in the slice direction to the interconnections 83. This suppresses intrusion of noise from the interconnection 83 via which digital signals are transmitted to the DAM chips 82 that deal with analog signals. As a result, it is possible to prevent degradation in terms of a standard deviation that is a measure of image noise. Besides, by disposing of the DAM chips 82 that deal with analog signals in both areas adjacent in the slice direction to the interconnections 83, it becomes possible to prevent the DAM chips 82 from being exposed to an X-ray and it also becomes possible to minimize the length of interconnections for the DAM chips 82.

Although the present invention has been described above with reference to specific embodiments, the invention is not limited to those embodiments, but many modifications are possible without departing from the scope of the invention.

For example, although in the embodiments described above, the X-ray CT scanner is assumed to be of a rotate/rotate type which is widely used at present and in which the X-ray tube and the X-ray detecting system are rotated in unison around a body being examined, the present invention may also be applied to a stationary/rotate type in which a great number of detector elements are disposed at fixed locations along a ring, and only an x-ray tube is rotated around a body being examined.

Furthermore, although in the embodiments described above, an incident X-ray is indirectly converted into an electric charge by first converting the X-ray into light by using a scintillator with a fluorescent material and further converting the light into the electric charge by using a photoelectric conversion element such as a photodiode, the X-ray may be directly converted into the electric charge by unit of, for example, photoconduction of a semiconductor, that is, generation of electron-hole pairs in the semiconductor and movement of electrons and holes to electrodes.

Furthermore, although in the embodiments described above, the X-ray CT scanner has a single X-ray tube, a plurality of pairs of an X-ray tube and an X-ray detecting system may be disposed on a rotating ring. That is, the present invention may also be applied to a multi-tube X-ray CT scanner.

What is claimed is:

1. An X-ray detection system comprising:
    a detector detecting an X-ray passing through a body being examined and producing an analog electric signal corresponding to the X-ray for each channel;
    a data acquisition unit including analog-digital converters and a plurality of circuit blocks each including as many circuits as the number of channels assigned to each block, converting the analog electric signal output from the detector into a digital signal for each channel by a corresponding analog-digital converter and outputting the resultant digital signal; and
    a phase control unit controlling the phase of the circuit blocks of the data acquisition unit such that the circuit blocks are grouped into a plurality of groups and the respective groups of circuit blocks operate in synchronization with clock signals for the analog-digital converters, phases of the clock signals for the analog-digital converters being mutually different at least between two groups.

2. An X-ray detection system according to claim 1, wherein
    the phase control unit controls the phase of the circuit blocks of the data acquisition unit such that the circuit blocks are grouped into two groups and the two groups of circuit blocks operate in synchronization with two respective clock signals that are opposite in phase.

3. An X-ray detection system according to claim 1, wherein the phase control unit comprises:
    an oscillator generating a reference clock signal; and
    a unit supplying the clock signal generated by the oscillator directly to at least one group of the plurality of groups of circuit blocks and supplying a clock signal produced by inverting the polarity of the clock signal generated by the oscillator to the remaining groups of circuit blocks.

4. An X-ray detection system according to claim 1, wherein
    the phase control unit includes as many oscillators generating reference clock signals to be supplied to the plurality of circuit blocks as there are circuit blocks, and the reference clock signals generated by the oscillators are supplied to the respective circuit blocks independently and asynchronously.

5. An X-ray detection system according to claim 1, wherein
the phase control unit includes a unit generating reference clock signals that are delayed by a specified time from one reference clock signal to another and supplying the resultant reference clock signals to respective circuit blocks.

6. An X-ray detection system according to claim 1, wherein
the detector is a two-dimensional detector including a two-dimensional detector array in which columns each including as many detector elements disposed in a channel direction as there are channels are disposed in a direction perpendicular to the slice direction,
the detector including a scintillator blocks disposed for each detector element, converting the X-ray into an optical signal, a photodiode array optically coupled with the scintillator blocks, converting the optical signals output from the scintillator blocks of respective detector elements into electrical signals, and a switching element array combining together electrical signals output from photodiodes of detector elements over a specified number of columns in the slice direction.

7. An X-ray detection system according to claim 6, wherein
the photodiode array, the switching element array, and the data acquisition unit are three-dimensionally disposed via a circuit board for each circuit block.

8. An X-ray computed tomography scanner comprising an X-ray detecting system according to claim 1, and a data processing unit reconstructing an image using data acquired by the X-ray detecting system.

9. An X-ray detecting system comprising:
a detector including a plurality of circuit blocks assigned to a specified number of channels, detecting an x-ray passing through a body being examined and producing an analog electric signal corresponding to the X-ray for each channel;
a data acquisition unit including as many circuit blocks as the number of circuit blocks of the detector, converting the analog electric signal output from the detector into a digital signal for each channel and outputting the resultant digital signal; and
voltage regulators disposed for the respective circuit blocks, regulating power supply voltages supplied to the respective circuit blocks at a specified voltage value to suppress a difference in the power supply voltages among the respective circuit blocks.

10. An X-ray detection system according to claim 9, wherein
the detector is a two-dimensional detector including a two-dimensional detector array in which columns each including as many detector elements disposed in a channel direction as there are channels are disposed in a direction perpendicular to the slice direction,
the detector including a scintillator blocks disposed for each detector element, converting the X-ray into an optical signal, a photodiode array optically coupled with the scintillator blocks, converting the optical signals output from the scintillator blocks of respective detector elements into electrical signals, and a switching element array combining together electrical signals output from photodiodes of detector elements over a specified number of columns in the slice direction.

11. An X-ray detection system according to claim 8, wherein
the photodiode array, the switching element array, and the data acquisition unit are three-dimensionally disposed via a circuit board for each circuit block.

12. An X-ray computed tomography scanner comprising an X-ray detecting system according to claim 9, and a data processing unit reconstructing an image using data acquired by the X-ray detecting system.

* * * * *